United States Patent
Rothschild

(10) Patent No.: US 8,200,564 B2
(45) Date of Patent: *Jun. 12, 2012

(54) METHOD AND SYSTEM FOR CREATING AN EQUITY EXCHANGE FUND FOR PUBLIC AND PRIVATE ENTITIES

(75) Inventor: Leigh M. Rothschild, Sunny Isles Beach, FL (US)

(73) Assignee: Reagan Inventions, LLC, Sunny Isles Beach, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/956,015

(22) Filed: Nov. 30, 2010

(65) Prior Publication Data
US 2011/0071938 A1   Mar. 24, 2011

Related U.S. Application Data

(63) Continuation of application No. 11/099,122, filed on Apr. 5, 2005, now Pat. No. 7,848,986.

(51) Int. Cl.
*G06Q 40/00* (2012.01)
(52) U.S. Cl. .................................... 705/36 R
(58) Field of Classification Search .................. 705/36 R
See application file for complete search history.

(56) References Cited

U.S. PATENT DOCUMENTS

| | | | |
|---|---|---|---|
| 5,500,793 A * | 3/1996 | Deming et al. ................. | 705/37 |
| 5,659,731 A | 8/1997 | Gustafson | |
| 6,832,211 B1 | 12/2004 | Thomas et al. | |
| 7,080,050 B1 | 7/2006 | Himmelstein | |
| 7,277,864 B2 * | 10/2007 | Ohnemus et al. ............... | 705/10 |
| 2001/0039526 A1 * | 11/2001 | Pittenger ......................... | 705/36 |
| 2002/0032643 A1 | 3/2002 | Himmelstein | |
| 2003/0014340 A1 * | 1/2003 | Perge et al. ..................... | 705/35 |
| 2003/0028527 A1 * | 2/2003 | Crosby et al. ..................... | 707/3 |
| 2003/0117443 A1 * | 6/2003 | Langner et al. ............... | 345/810 |
| 2004/0107157 A1 * | 6/2004 | Bleunven et al. ............... | 705/37 |
| 2004/0133439 A1 * | 7/2004 | Noetzold et al. ................. | 705/1 |
| 2004/0143536 A1 * | 7/2004 | Haberle .......................... | 705/37 |
| 2004/0177020 A1 | 9/2004 | Alderman et al. | |
| 2005/0044024 A1 * | 2/2005 | Davis .............................. | 705/35 |
| 2005/0049948 A1 * | 3/2005 | Fuscone .......................... | 705/35 |
| 2006/0155638 A1 | 7/2006 | de la Motte | |

(Continued)

OTHER PUBLICATIONS

Lodge, Steve: Why not swap 'n' save? Jul. 1996 The Independent (London), pp. 1-3.*

(Continued)

*Primary Examiner* — Bijendra K Shrestha
(74) *Attorney, Agent, or Firm* — Atanu Das; DaVinci IP

(57) ABSTRACT

A method and system for creating an equity exchange fund for public and private entities are provided. The method includes the steps of receiving an application to participate in the fund from at least one investor, the investor having a position in at least one commercial entity; evaluating the entity based on at least one predetermined criteria; if the entity is acceptable, performing a valuation of the position in the entity; and determining a number of shares of the fund to be exchanged for the position in the entity. The determining the number of shares step includes determining a future value of the position at a scheduled date of liquidation of the fund; dividing the future value of the position by a total current fund value plus the future value of the position to determine a ratio; and multiplying a number of shares of the fund by the ratio.

17 Claims, 3 Drawing Sheets

U.S. PATENT DOCUMENTS

2006/0178963 A1* 8/2006 Masuyama .................... 705/35

OTHER PUBLICATIONS

Microsoft Office Online: Microsoft Excel 2003—Calculate Percentage, www.microsoft.com/en-us/excel, pp. 1-9.*
Present Value and CAGAR Formula:Present value / rate of return, www.moneychimp.com, pp. 1-2.*
Twibell, David A.: Understanding Exchange Funds, Financial Advisor Magazine, Nov. 2004, pp. 1-3.*
Hoffman, J.: Diversifying Company Stock With Exchange Funds, Institute of Certified Financial Planners, Jun. 1999, pp. 1-2.*
Lodge, Steve: Why not swap 'n' save? Jul. 1996, The Independent (London), pp. 1-3.
Twilbell, David A.: Understanding Exchange Exchange Funds, Nov. 2004 Financial Advisor (www.fa-mag.com), pp. 1-4.
Microsoft Office Online: Microsoft Excel 2003—Calculate Percentage, www.microsfot.com/en-us/excel, pp. 1-9.
Present Value and CAGAR Formula:Present value/rate of return, www.moneychimp.com, pp. 1-2.

* cited by examiner

METHOD AND SYSTEM FOR CREATING AN EQUITY EXCHANGE FUND FOR PUBLIC AND PRIVATE ENTITIES

PRIORITY

The present application is a continuation application of U.S. patent application Ser. No. 11/099,122 filed Apr. 5, 2005, now U.S. Pat. No. 7,848,986, the contents of which are hereby incorporated by reference in their entirety.

BACKGROUND

1. Field

The present disclosure relates generally to data processing and financial decision systems, and more particularly, to a method and system for creating an equity exchange fund for public and private entities.

2. Description of the Related Art

When investing money, diversity of investments and security for investments are two critical factors that a sophisticated investor will look at. In today's current business environment, many investors seek financial vehicles that will allow them a blend of security, rates of return, and liquidity. Moreover, a smart investor will not want to place a substantial part of their capital in one investment vehicle, no matter what that vehicle may be. This is particularly true in the last seven years where many investments (even large cap investments) have been shown to be extremely volatile.

Yet many entrepreneurs and/or major shareholders of public and private companies have a lot of their capital tied up in a single stock, most commonly the stock of the company they are or have been associated with. It is quite common for founders/early company employees or early corporate investors to accumulate substantial amounts of stock in a single private or public company. However, by having a substantial position in a single stock, the investor/employee is devoid of a primary investment goal of diversification. Furthermore, to diversify their holdings, the investor will have to sell their position, most likely incurring capital gains, and then decide how to reinvest the proceeds to ensure diversity and security—a daunting task for most.

Therefore, a need exists for techniques for creating an exchange fund that allows investors in private and public commercial entities to diversify their holdings and reduce their overall risk. Furthermore, a need exists for an equity exchange fund to allow investors to diversify their holdings without selling their holdings and incurring capital gains.

SUMMARY

A method and system for creating an equity exchange fund for public and private entities are provided.

According to one aspect of the present disclosure, a method for creating an equity exchange fund is provided, the method including the steps of receiving an application to participate in the fund from at least one investor, the investor having a position in at least one commercial entity; evaluating the at least one commercial entity based on at least one predetermined criteria; if the at least one commercial entity is acceptable, performing a valuation of the position in the at least one commercial entity; and determining a number of shares of the fund to be exchanged for the position in the at least one entity. The determining the number of shares step further includes the steps of determining a future value of the position in the at least one entity at a scheduled date of liquidation of the fund; dividing the future value of the position in the at least one entity by a total current fund value plus the future value of the position in the at least one entity to determine a first ratio; and multiplying a number of shares of the fund by the first ratio.

The at least one investor may be an individual or a commercial entity. In one aspect, the at least one commercial entity is a private company, wherein the at least one predetermined criteria includes a time until the at least one commercial entity can achieve an IPO; a balance sheet; a P and L statement; quality of business plan; quality of management; competition within business sector; and quality of business sector. In another aspect, the at least one commercial entity is a public company, wherein the at least one predetermined criteria includes a balance sheet; a P and L statement; quality of business plan; quality of management; competition within business sector; quality of business sector; stock trading price for last several years; stock trading volume for last several years; earnings per share; and market capitalization.

In a further aspect of the present disclosure, a system for creating an equity exchange fund is provided. The system includes means for receiving an application to participate in the fund from at least one investor, the investor having a position in at least one commercial entity; means for evaluating the at least one commercial entity based on at least one predetermined criteria; means for performing a valuation of the position in the at least one commercial entity; and means for determining a number of shares of the fund to be exchanged for the position in the at least one entity.

In yet another aspect, a program storage device readable by a machine, tangibly embodying a program of instructions executable by the machine to perform method steps for creating an equity exchange fund is provided, the method steps including receiving an application to participate in the fund from at least one investor, the investor having a position in at least one commercial entity; evaluating the at least one commercial entity based on at least one predetermined criteria; if the at least one commercial entity is acceptable, performing a valuation of the position in the at least one commercial entity; and determining a number of shares of the fund to be exchanged for the position in the at least one entity.

In another aspect of the present disclosure, a server for managing an equity exchange fund is provided including a communication device for receiving an application to participate in the fund from at least one client, the client having a position in at least one commercial entity; and a processor for evaluating the at least one commercial entity based on at least one predetermined criteria, for performing a valuation of the position in the at least one commercial entity and for determining a number of shares of the fund to be exchanged for the position in the at least one entity. The processor determines the number of shares by determining a future value of the position in the at least one entity at a scheduled date of liquidation of the fund; dividing the future value of the position in the at least one entity by a total current fund value plus the future value of the position of the at least one entity to determine a first ratio; and multiplying a number of shares of the fund by the first ratio.

BRIEF DESCRIPTION OF THE DRAWINGS

The above and other aspects, features, and advantages of the present disclosure will become more apparent in light of the following detailed description when taken in conjunction with the accompanying drawings in which.

DETAILED DESCRIPTION

Preferred embodiments of the present disclosure will be described hereinbelow with reference to the accompanying drawings. In the following description, well-known functions or constructions are not described in detail to avoid obscuring the present disclosure in unnecessary detail.

A method and system for creating an equity exchange fund for public and private entities are provided. The method and system of the present disclosure allows a community of investors, e.g., individuals or companies, to share in the risk of holding large amounts of stock in small public or private companies by diversifying the risk without selling the equity positions.

In utilizing the methods and systems of the present disclosure described herein, a user will be able to accomplish the various applications of the disclosure which are described below in relation to FIG. 1, which illustrates an overall flow diagram of the method and system of the present disclosure.

An investor 102, 104, 106, e.g., an individual or company, in a private or public company holds a large amount of stock in one company, e.g., an equity position. The investor wishes to diversify his total financial portfolio position. He contacts the fund manager 108, for example, via electronic submission of an application over the Internet, and is accepted in the exchange fund 110. The exchange fund will issue a share interest to the investor prorata to the total current value of the fund relative to the value assigned by the fund manager to the investor's stock. The investor will receive the full value of the shares at the assigned time the fund manager liquidates the fund, and assesses the value of the fund. The investor will also receive any dividends for the fund that the fund manager declares from time to time. The investor will thus accomplish diversifying his financial portfolio, spreading the risk among many companies, and also will take advantage of any tax laws in effect applying to tax free exchange funds.

In a preferred embodiment, the fund manager 108 will be an application service provider (ASP) residing on a server and all transactions to be described will occur electronically, via a hardwired or wireless connection, over a network of computers, e.g., the Internet. Each of the investors will be coupled to the fund manager via a client application, e.g., an Internet browser, and will access the fund manager via a web interface, e.g., an HTML constructed web page.

Figure 2:
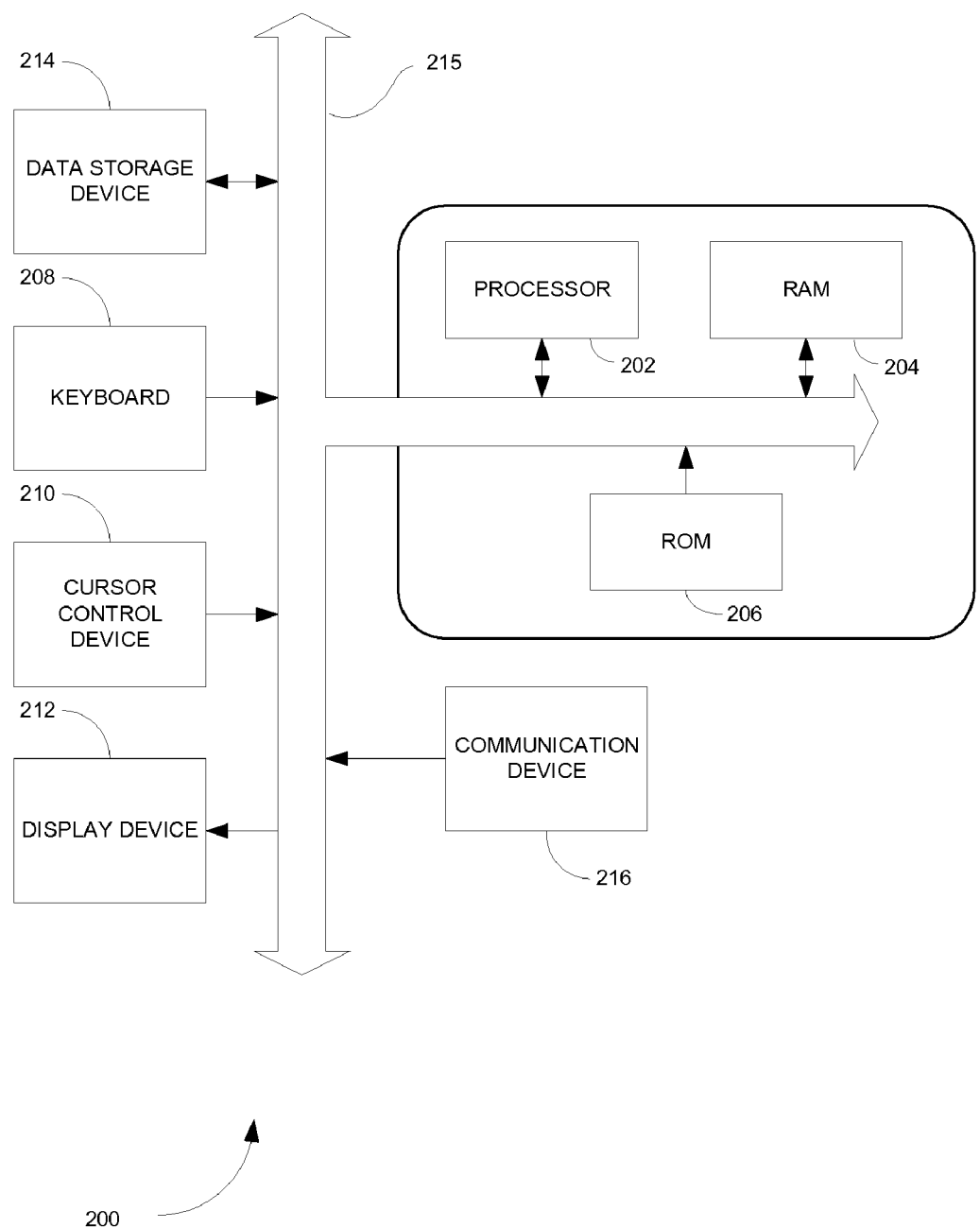
FIG. 2 is an exemplary computer for use in the system shown in FIG. 1.

It is to be understood that the present disclosure may be implemented in various forms of hardware, software, firmware, special purpose processors, or a combination thereof. In one embodiment, the present disclosure may be implemented in software as an application program tangibly embodied on a program storage device. The application program may be uploaded to, and executed by, a machine comprising any suitable architecture such as a personal computer, a workstation or server. Referring to FIG. 2, preferably, the machine 200 is implemented on a computer platform having hardware such as one or more central processing units (CPU) 202, a random access memory (RAM) 204, a read only memory (ROM) 206 and input/output (I/O) interface(s) such as a keyboard 208, cursor control device 210 (e.g., a mouse or joystick) and display device 212. A system bus 215 couples the various components and may be any of several types of bus structures including a memory bus or memory controller, a peripheral bus, and a local bus using any of a variety of bus architectures. The computer platform also includes an operating system and micro instruction code. The various processes and functions described herein may either be part of the micro instruction code or part of the application program (or a combination thereof) which is executed via the operating system.

In addition, various other peripheral devices may be connected to the computer platform by various interfaces and bus structures, such a parallel port, serial port or universal serial bus (USB). One such peripheral device may include a communications device 216, e.g., a modem, satellite relay, wireless connection, etc., for enabling communications from the fund manager 108 to various clients, e.g., investors 102, 104, 106 or external sources 112, 114, 116, 118 for accessing financial databases. Other peripheral devices may include additional storage devices 214 and a printer.

It is to be further understood that, because some of the constituent system components and method steps depicted in the accompanying figures may be implemented in software, the actual connections between the system components (or the process steps) may differ depending upon the manner in which the present disclosure is programmed. Given the teachings of the present disclosure provided herein, one of ordinary skill in the related art will be able to contemplate these and similar implementations or configurations of the present disclosure.

The computer 200 may operate in a networked environment using logical connections to one or more remote computers. The remote computer may be a personal computer, a server, a router, a network PC, a peer device or other common network node, and typically includes many or all of the elements described above relative to the computer 200. It is to be appreciated that the network may be a local area network (LAN), wide area network (WAN), the Internet or any known network that couples a plurality of computers to enable various modes of communication via network messages. For example, the system may be a corporate intranet including a single server and multiple personal computers housed within a single facility, or alternatively, multiple servers with multiple personal computers located in various geographic locations.

Figure 1:
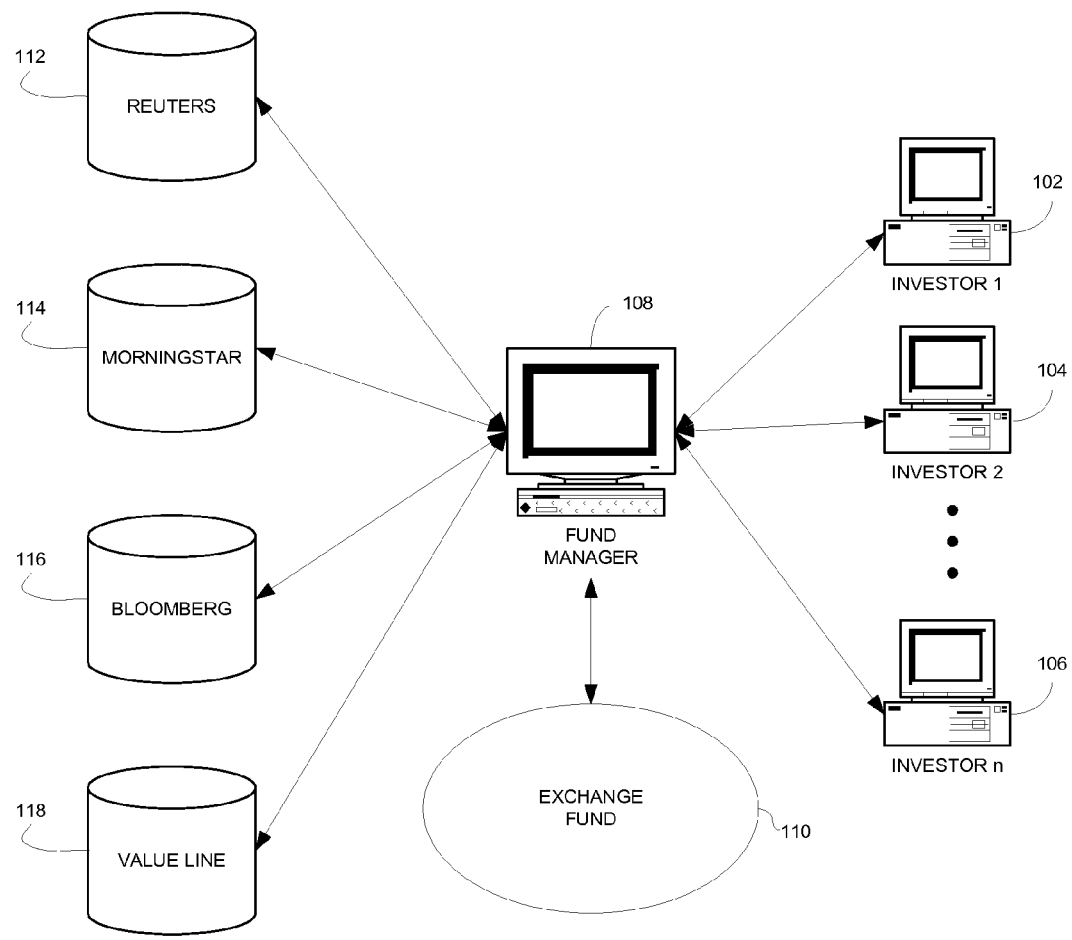
FIG. 1 is a flow diagram of a method and system for creating an equity exchange fund in accordance with an embodiment of the present disclosure.
Figure 3:
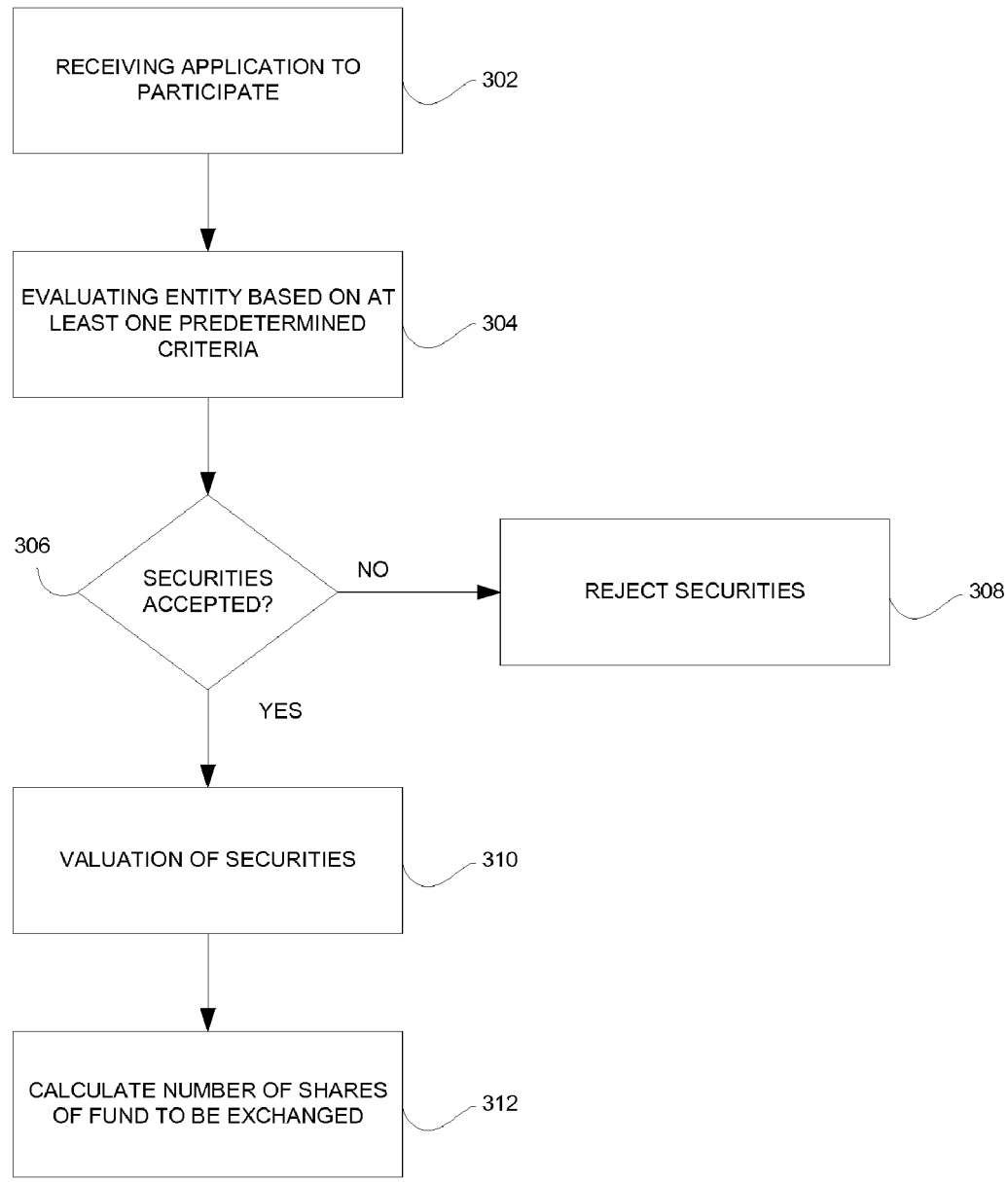
FIG. 3 is a flow diagram illustrating a method for creating the equity exchange fund in accordance with an embodiment of the present disclosure.

With reference to FIGS. 1 and 3, the method and system of the present disclosure will now be described.

Initially, an investor 102, 104, 106 with a substantial position, e.g., a holding of securities, in a commercial entity submits an application to participate in the exchange fund 110 to a Fund Manager (FM) 108 (step 302). The investor may have a substantial position in a public company, a private company or a combination of both. Preferably, the investor 102 will submit their application to participate in the exchange fund 110 electronically by filling out a web-based application, e.g., a form, on a local computer coupled to the Fund Manager 108 via a network, e.g., the Internet. The application may be accessed by any known commercially available Internet browser, e.g., Microsoft™ Internet Explorer, Netscape™ Navigator, etc. The investor will provide such information as the name of the entity, stock exchange ticker symbol, number of shares held, etc. Furthermore, the form will prompt the investor to enter financial and other types of data regarding the entity which will be utilized in evaluating the entity, as will be described below.

Once the application is received, the FM 108 will evaluate the entity for which the investor has a position in (step 304), to determine if the investor's position will be accepted in the exchange fund 110. The FM 108 may be one person or a group of persons who administer the exchange fund 110.

Preferably, the FM 108 will be an application program residing on a server, where the FM 108 receives information on the entity, accesses financial databases 112, 114, 116, 118 to retrieve information on the entity and determines if the retrieved information exceeds predetermined thresholds. In the case of a private company submission, the FM 108 evaluates the entity based on, but not limited to, the following criteria:

Time till company can achieve an IPO
Company balance sheet
Company P and L statement
Quality of Business Plan
Quality of Management
Competition within business sector
Quality of Business Sector
Other evaluative tools The evaluation may be based on a single variable exceeding a predetermined threshold or, alternatively, a cumulative or composite score will be calculated based on the various information available. The FM 108 then decides whether to accept the investor (step 306) and, if acceptable, comes to a valuation for the entity's securities, as will be described below. Otherwise, the entity's securities will be rejected, and thus so will the investor's application (step 308).

In the case of a public company submission, the FM 108 evaluates the entity based on, but not limited to, the following criteria:

Company balance sheet
Company P and L statement
Quality of Business Plan
Quality of Management
Competition within business sector
Quality of Business Sector
Stock trading price for the last several years
Stock volume for the last several years
Earnings per share
Market capitalization, i.e., closing share price multiplied by total number of shares outstanding
Other evaluative tools Preferably, the FM 108 automatically obtains the above-listed information by accessing a plurality of commercially available databases, e.g., Reuters 112, Morningstar 114, Bloomberg 116, Value Line 118, etc. Alternatively, the FM 108 includes a database for storing a plurality of financial records relating to the at least one entity, similar to the external sources listed above. In this embodiment, the FM 108 will simply access its own database to retrieve at least one record of the at least one entity to determine if the at least one entity meets the at least one predetermined criteria.

The FM 108 then decides whether to accept the securities into the fund by comparing at least one criteria, e.g., earnings per share, to a predetermined threshold. Alternatively, the FM 108 will calculate a composite score for the entity based on all available information and will compare the composite score to a predetermined threshold score. Upon acceptance, the FM 108 comes to a valuation for the entity taking into account the current market capitalization for the entity, as detailed by the published stock price.

If the entity is accepted by the FM 108 (step 306), the FM 108 will then make a valuation of the securities (step 310) and calculate the number of shares the investor shall receive in the exchange fund (step 312). In determining a valuation of the securities, the FM 108 will determine the future value of the position of the securities in the entity at a scheduled date of the exchange fund liquidation. Future value is the value in today's dollars assigned to an amount of money in the future, based on an estimated rate-of-return over the long-term. The future value (FV) of the position in the entity can be determined by the following formula:

$$FV = PV(1+R)N \quad (1)$$

where PV is the present value of the position of the securities in the entity, R is the interest rate and N is the number of years to liquidation of the exchange fund.

Once the valuation is complete, the number of shares of the exchange fund to be exchanged with the investor's securities, i.e., the investor's position, will equal the future value (FV) of the position in the subject entity at the scheduled date of the fund liquidation divided by the total current exchange fund value as calculated by the FM plus the future value (FV) of the position in the subject company times the number of shares that currently exist in the exchange fund, expressed as a formula by:

$$\text{Shares} = \left(\frac{FV}{\text{Total Current Fund Value} + FV}\right) * \text{Number of Overall Fund Shares} \quad (2)$$

Once the exchange is complete, the FM 108 will be allowed to sell any stocks received in the exchange fund whether public or private, and to reinvest this money as he best sees fit. For example, the FM may accumulate a portfolio of stocks, bonds, cash or other securities. Furthermore, the FM may invest in other types of funds for example index funds, global or international funds, bond funds, balanced funds, small-cap funds, mid-cap funds, large-cap funds, etc. The FM 108 will also have the power to declare dividends in the exchange fund 110 from time to time. The dividend will be shared prorata with the shareholders of the fund at the time the dividend is declared.

The FM 108 will be required to properly liquidate the exchange fund 110 at a predetermined and specified date. This date will be set and announced during the organization period for the fund, and will vary depending on the applicable United States income tax code. Once the fund is liquidated, each shareholder will then receive his final payment based on the value of the fund times the number of shares the shareholder has.

A method and system for creating an equity exchange fund for public and private entities have been described. By having a user participate in the equity exchange fund, diversification can be achieved. By owning securities of a greater number and variety of companies than an individual investor is likely to own, the exchange fund is impacted less by the ups and downs of a particular security than a portfolio with more limited holdings. Furthermore, by participating in the exchange fund, an investor will have the benefit of professional guidance by the fund manager (FM) so the investor will not have to research every stock or bond by themselves.

While the disclosure has been shown and described with reference to certain preferred embodiments thereof, it will be understood by those skilled in the art that various changes in form and detail may be made therein without departing from the spirit and scope of the disclosure as defined by the appended claims.

What is claimed is:

1. A method for creating an equity exchange fund over a computer network, the method comprising the steps of:
   receiving, by a server coupled to the computer network, an application to participate in the fund from at least one investor via a client application, the at least one investor having a position in at least one commercial entity;

evaluating, by the server, the at least one commercial entity based on at least one predetermined financial performance criteria; if the at least one commercial entity is acceptable, performing, by the server, a valuation of the position in the at least one commercial entity;

calculating a composite score from a plurality of criteria and financial information of the at least one commercial entity and comparing the composite score to a predetermined threshold;

issuing, by the server, a determined number of shares of the fund in exchange for the position in the at least one commercial entity without requiring the at least one investor to sell the position, wherein the position in the at least one commercial entity is sold and reinvested by the fund;

crediting, by the server, a cash value to the at least one investor at the date of deposit, the cash value equaling the determined number of shares times a value per share of the fund at the date of deposit; and wherein the number of shares to be exchanged is determined based on the future value of the position, total current fund value, number of overall fund shares, interest rate, and number of years to liquidate the fund.

2. The method as in claim 1, wherein the at least one commercial entity is a private company.

3. The method as in claim 1, wherein the at least one predetermined financial criteria includes a time until the at least one commercial entity can achieve an IPO; a balance sheet; a P and L statement; quality of business plan; quality of management; competition within business sector; and quality of business sector.

4. The method as in claim 1, wherein the at least one commercial entity is a public company.

5. The method as in claim 1, wherein the at least one predetermined criteria includes a balance sheet; a P and L statement; quality of business plan; quality of management; competition within business sector; quality of business sector; stock trading price for last several years; stock trading volume for last several years; earnings per share; and market capitalization.

6. The method as in claim 1, wherein the application is a web-based form and is electronically transmitted.

7. The method as in claim 1, wherein the position in the at least one commercial entity includes restricted securities.

8. The method of claim 1, further comprising issuing a dividend to the at least one investor based on the determined number of shares.

9. A server for managing an equity exchange fund comprising:

a communication device for receiving an application to participate in the fund from at least one client, the at least one client having a position in at least one commercial entity; and a processor for evaluating the at least one commercial entity based on at least one predetermined financial performance criteria, for performing a valuation of the position in the at least one commercial entity, for determining a number of shares of the fund to be exchanged for the position in the at least one entity and for issuing the determined number of shares of the fund in exchange for the position in the at least one commercial entity without requiring the at least one investor to sell the position, wherein the position in the at least one commercial entity is sold and reinvested by the fund, wherein the processor determines the number of shares based on the future value of the position, total current fund value, number of overall fund shares, interest rate, and number of years to liquidate the fund;

wherein the processor credits a cash value to the at least one investor at the date of deposit, the cash value equaling the determined number of shares times a value per share of the fund at the date of deposit; and wherein evaluating the at least one commercial entity includes calculating a composite score from a plurality of criteria and financial information of the at least one commercial entity and comparing the composite score to a predetermined threshold.

10. The server as in claim 9, further comprising a database for storing a plurality of financial records relating to the at least one entity, wherein the processor retrieves at least one record of the at least one entity to determine if the at least one entity meets the at least one predetermined financial criteria.

11. The server as in claim 10, wherein the application is a web-based form residing on the server and is accessed by the at least one client over a network.

12. The server as in claim 9, wherein the at least one commercial entity is a private company.

13. The server as in claim 9, wherein the at least one predetermined financial criteria includes a time until the at least one commercial entity can achieve an IPO; a balance sheet; a P and L statement; quality of business plan; quality of management; competition within business sector; and quality of business sector.

14. The server as in claim 9, wherein the at least one commercial entity is a public company.

15. The server as in claim 9, wherein the at least one predetermined criteria includes a balance sheet; a P and L statement; quality of business plan; quality of management; competition within business sector; quality of business sector; stock trading price for last several years; stock trading volume for last several years; earnings per share; and market capitalization.

16. The server as in claim 9, wherein the position in the at least one commercial entity includes restricted securities.

17. The server of claim 9, wherein the processor issues a dividend to the at least one investor based on the determined number of shares.

* * * * *